US008677255B1

(12) United States Patent
Mitnick et al.

(10) Patent No.: US 8,677,255 B1
(45) Date of Patent: Mar. 18, 2014

(54) EXPANDED CONTAINER VIEW FOR GRAPHICAL EDITING ENVIRONMENT

(75) Inventors: Victor Mitnick, San Carlos, CA (US); Alain M. Dumesny, Sunnyvale, CA (US); Dexter Reid, San Francisco, CA (US); Gabriel Chua, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1993 days.

(21) Appl. No.: 10/927,963

(22) Filed: Aug. 27, 2004

(51) Int. Cl.
*G06F 3/048* (2013.01)

(52) U.S. Cl.
USPC .......................................... 715/763; 715/504

(58) Field of Classification Search
USPC ................... 715/508, 524, 527, 731, 865, 763
See application file for complete search history.

(56) References Cited

U.S. PATENT DOCUMENTS

| | | | |
|---|---|---|---|
| 5,463,725 A | 10/1995 | Henckel et al. | |
| 5,528,744 A | 6/1996 | Vaughton | |
| 5,917,492 A | 6/1999 | Bereiter et al. | |
| 5,943,053 A * | 8/1999 | Ludolph et al. | 715/790 |
| 6,002,397 A | 12/1999 | Jaaskelainen, Jr. | |
| 6,031,989 A | 2/2000 | Cordell | |
| 6,088,708 A * | 7/2000 | Burch et al. | 715/509 |
| 6,337,698 B1 | 1/2002 | Keely et al. | |
| 6,694,487 B1 * | 2/2004 | Ilsar | 715/527 |
| 6,763,497 B1 | 7/2004 | Softky | |
| 7,076,733 B2 * | 7/2006 | Smith | 715/716 |
| 7,081,882 B2 | 7/2006 | Sowden et al. | |
| 7,113,190 B2 | 9/2006 | Heaton | |
| 7,149,960 B1 | 12/2006 | Brooks et al. | |
| 7,248,269 B2 | 7/2007 | Card et al. | |
| 7,395,525 B2 | 7/2008 | Softky | |
| 7,472,343 B2 | 12/2008 | Vasey | |
| 2002/0140736 A1 | 10/2002 | Chen | |
| 2002/0188632 A1 * | 12/2002 | Su | 707/513 |
| 2003/0043177 A1 * | 3/2003 | Kawai | 345/700 |
| 2003/0071849 A1 | 4/2003 | Ferri | |
| 2003/0160832 A1 | 8/2003 | Ridgley et al. | |
| 2004/0008228 A1 * | 1/2004 | Smith | 345/780 |
| 2005/0283734 A1 | 12/2005 | Santoro et al. | |

(Continued)

OTHER PUBLICATIONS

Wayback Machine "W3schools Division Tutorial", http://web.archive.org/web/20030801072752/http://www.w3schools.com/tags/tag_div.asp, Published Aug. 1, 2003.*

(Continued)

*Primary Examiner* — William Bashore
*Assistant Examiner* — Henry Orr
(74) *Attorney, Agent, or Firm* — Kilpatrick Townsend & Stockton LLP

(57) ABSTRACT

A Web development environment includes a design view mode that provides an expanded view of container constructs within Web page being edited. When operating in a design view of the development environment, the user is provided an option to view all container constructs in an expanded view. The expanded view will temporarily increase the visual attributes of the container constructs allowing the user to more easily access the editing regions within the cells or content locations of the container. Increasing the visual attributes also allows the developer to see the structure of the edited Web page more clearly. When the developer is finished working with the container, he or she may then return to a standard or other view offered by the graphical development environment. The resulting containers will be re-rendered according to the originally-coded size, without the additional space added for viewing in the expanded mode.

44 Claims, 8 Drawing Sheets

(56) References Cited

U.S. PATENT DOCUMENTS

| | | |
|---|---|---|
| 2006/0015804 A1* | 1/2006 | Barton et al. ........... 715/503 |
| 2006/0031754 A1* | 2/2006 | Lehenbauer et al. ..... 715/510 |
| 2006/0282766 A1 | 12/2006 | Parsell |
| 2007/0162953 A1 | 7/2007 | Bolliger et al. |
| 2007/0277149 A1 | 11/2007 | Stevens |
| 2008/0016472 A1 | 1/2008 | Rohlf et al. |
| 2008/0270933 A1 | 10/2008 | Straw et al. |
| 2009/0031247 A1 | 1/2009 | Walter et al. |

OTHER PUBLICATIONS

Wayback Machine "W3schools CSS Margin Tutorial", http://web.archive.org/web/20031210134241/http://www.w3schools.com/css/css_margin.asp, Published Dec. 10, 2003.*

Wayback Machine "W3schools CSS Border Tutorial", http://web.archive.org/web/20031204195615/http://www.w3schools.com/css/css_borderasp, Published Dec. 4, 2003.*

U.S. Appl. No. 11/546,002, filed Oct. 10, 2006.

Office Action dated Oct. 6, 2009 in related U.S. Appl. No. 11/546,002.

U.S. Appl. No. 11/175,114, filed Jul. 5, 2005.

Office Action dated Apr. 28, 2009 in related U.S. Appl. No. 11/174,114.

Interview Summary dated Jan. 7, 2009 in related U.S. Appl. No. 11/174,114.

Office Action dated Oct. 3, 2008 in related U.S. Appl. No. 11/175,114.

Interview Summary dated Aug. 18, 2008 in related U.S. Appl. No. 11/175,114.

Office Action dated Apr. 17, 2008 in related U.S. Appl. No. 11/175,114.

Office Action dated Oct. 9, 2007 in related U.S. Appl. No. 11/175,114.

* cited by examiner

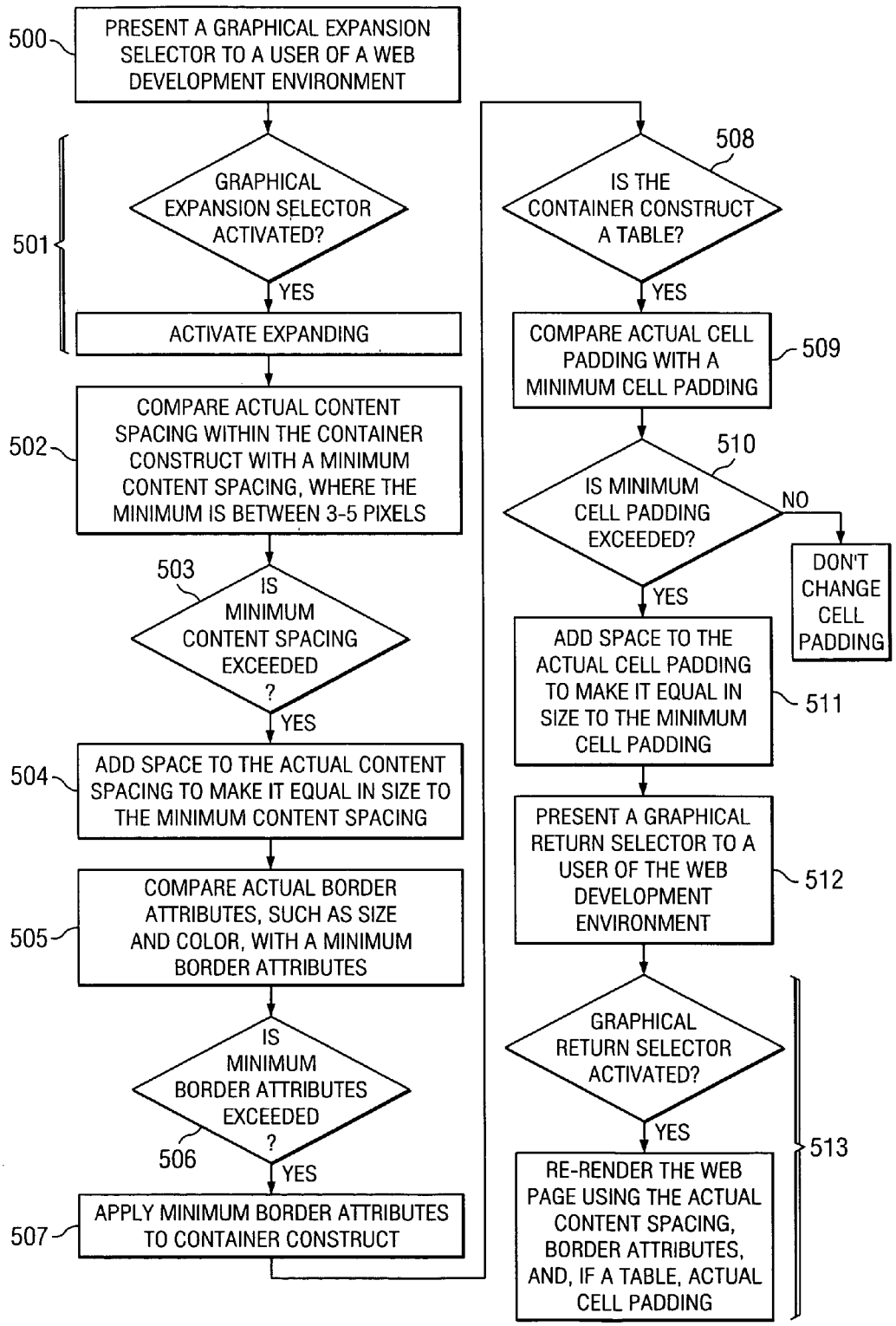

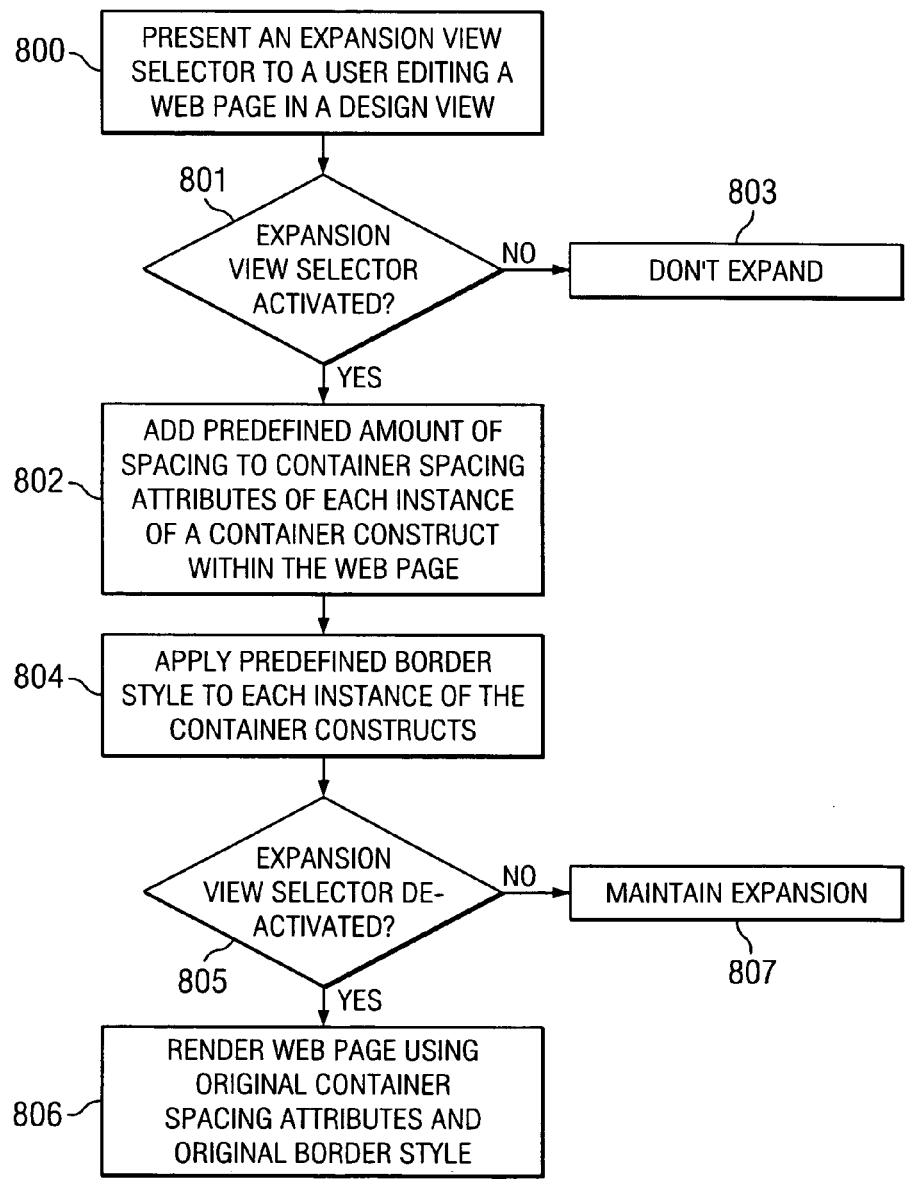

EXPANDED CONTAINER VIEW FOR GRAPHICAL EDITING ENVIRONMENT

TECHNICAL FIELD

The present invention relates, in general, to graphical editing environments and, more specifically, to expanded container views for graphical editing environments.

BACKGROUND OF THE INVENTION

Over the last decade, the World Wide Web (WWW) has grown from simple graphics and hyperlinks into rich and complex multimedia sites and presentations. Hypertext Markup Language (HTML) is a tag-based markup language that describes the visible format of data. It was one of the first and remains a widely used computer language used to build Web pages and Websites. Because HTML is a text-based language, early developers used simple text-editors to code and develop Web pages. As the popularity of the WWW increased, specific Web development tools evolved, such as HTML editors. HTML editors are essentially text editors specialized for writing HTML code. They assist the HTML author by cataloging HTML tags and common structures into menus and by being able to identify certain syntax errors. HTML editors also often display tags and content in colors so they stand out for easy reference and organization.

HTML editors improved the development experience over simple text-editors. However, the developer typically still used a Web browser or browser shell built into the HTML editor in order to view the actual appearance of the resulting Web page. While experienced Web developers are capable of intuitively coding a page that resulted in an expected visual appearance, the workflow for less-experienced developers generally included writing code, viewing the resulting appearance rendered in a Web browser, returning to the HTML editor to write more code or correct the existing code, re-rendering the new page to view the resulting appearance, returning again to the HTML editor to continue writing code, and so forth. This inefficient trial and error workflow increased the inconvenience of Web development to an ever increasing population of less-experienced Web developers. To overcome this inefficiency, graphical Web editing environments were developed.

Graphical Web editing environments generally include browser technology that interprets the HTML and displays the resulting Web page to the developer within an editing view or design view. Thus, a developer may edit the Web page by moving the rendered page content or insert graphical material directly in the design view of the editing environment. The editing environment then automatically generates the underlying HTML code to support the graphical editing. Web development environments that include such graphical-based editing includes MACROMEDIA INC.'s DREAMWEAVER™, ADOBE SYSTEMS, INC.'s GO LIVE™, MICROSOFT CORPORATION's FRONTPAGE™, and the like. Some Web editing environments, such as DREAMWEAVER™, include both graphical-based and text-based editing views that may be simultaneously displayed to the user and automatically show changes to the other view as a user makes edits in the opposite view.

In developing Web pages, developers typically use container constructs for arranging information or content on the page. In HTML, a table is a popular container construct that is widely used in the design and development of Web pages. A table is generally a collection of cells arranged in row-column format. Table content is normally contained within the cell. Additional attributes of an HTML table include a border, which is the outer edge of the table and the cells, cell padding, which is the amount of space around the content of a cell, and cell or content spacing, which is the amount of space between the cells and between the cells and the table border. Developers may manipulate these attributes to control the appearance and presentation of the table. For example, in HTML, a developer may use the code, <table border="0" cellpadding="0" cellspacing="0"> . . . </table>, to create a table having zero cell padding and cell spacing and no visible border.

When viewed in the design or graphical view of a development environment, a table is usually displayed as it will appear on the final Web page. In order for a developer to work with a table, he or she maneuvers the cursor into the editing or picking region of the table's cells. The editing or picking region is the region in which the cursor changes from a pointer to an insertion marker that indicates the region within the cell that contains the information that may be edited. In larger-sized table cells, it is relatively easy to place the cursor within the picking region in order to edit the content of the table. However, when the cells are very small or when there are nested tables, it may be very difficult, if not impossible, for the developer to place the cursor in the appropriate editing or picking region. This difficulty may be increased if the table has a zero border size, no cell or content spacing, and/or no cell padding. As a result, a developer may accidentally place the cursor in the wrong picking region (e.g., the wrong cell of the table, or even the wrong cell of the wrong table), select the table border, or not be able to select the desired cell at all. Therefore, when working with small tables or tables with nested or embedded tables, a developer is generally more deliberate and, thus, more slow, in his or her actions in order to select the desired picking or editing regions with in a cell. The increased physical care may also be effected by the accuracy of the developer's pointing device or physical coordination, which may sometimes decrease the efficiency and accuracy of Web development.

Additionally, without a border, spacing, and/or cell padding, it may be difficult or impossible for the developer to view the structure of the Web page. Part of Web development includes designing the entire structure and layout of the page. During the design or editing process, if the developer cannot view the structure of the page, the design process may also be slowed or difficult.

In order to reduce this problem, especially in cases in which there are no borders, no cell padding, and/or no cell spacing, some graphical development environments add an option to place dotted lines to outline where the actual border of the table is located. However, when working with small tables and nested tables, some of these inserted lines may overlap. Therefore, the developer may still have a difficult time working with the table.

A similar problem has developed with the advent of Cascading Style Sheets (CSS). CSS is a style sheet language that allows authors and users to define style attributes, such as fonts, spacing, and the like, to structured documents, such as HTML. By separating the presentation style of documents from the content of documents, CSS typically results in simplified Web authoring and site maintenance. A division or DIV tag is a container construct within HTML that is often used in conjunction with CSS. A DIV tag may sometimes define an area of a rectangle in which content is located. It can be set up with characteristics that are similar to an HTML table, such as padding and border attributes, by applying certain CSS properties. For example, in HTML, a developer may use the code, <div style="border-width:0px; padding: 0px; margin:0px; width:100px; height:100px; left:100px;

top: 100px;"> div contents</div>, to create a rectangular division having zero margin and padding and no visible border. Thus, if several DIV container rectangles are rendered closely together in the browser or a design view, the rendered images may not provide adequate space for a developer to easily select the desired picking or editing regions and may not provide enough information to the developer on the structure and layout of the Web page.

BRIEF SUMMARY OF THE INVENTION

The present invention is directed to a system and method for providing an expanded view of container constructs in graphical Web development environments. When operating in the design or graphical view of the development environment, the user is provided an option to view all container constructs in an expanded view. The expanded view will temporarily increase the visual attributes or parameters of the containers allowing the user to more easily access the editing or picking regions within the cells or content locations of the container. Increasing the visual attributes also allows the user or developer to see the layout or structure of the edited Web page more clearly. When the user is finished working with the container, he or she may then return to a standard or any other view offered by the graphical development environment. The resulting containers will be rendered according to the originally coded size, without the additional space added for viewing in the expanded mode.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 5 is a flowchart illustrating example steps executed in implementing an additional embodiment of the present invention;

FIG. 8 is a flowchart illustrating example steps executed in implementing an alternative embodiment of the present invention.

DETAILED DESCRIPTION OF THE INVENTION

Figure 1:
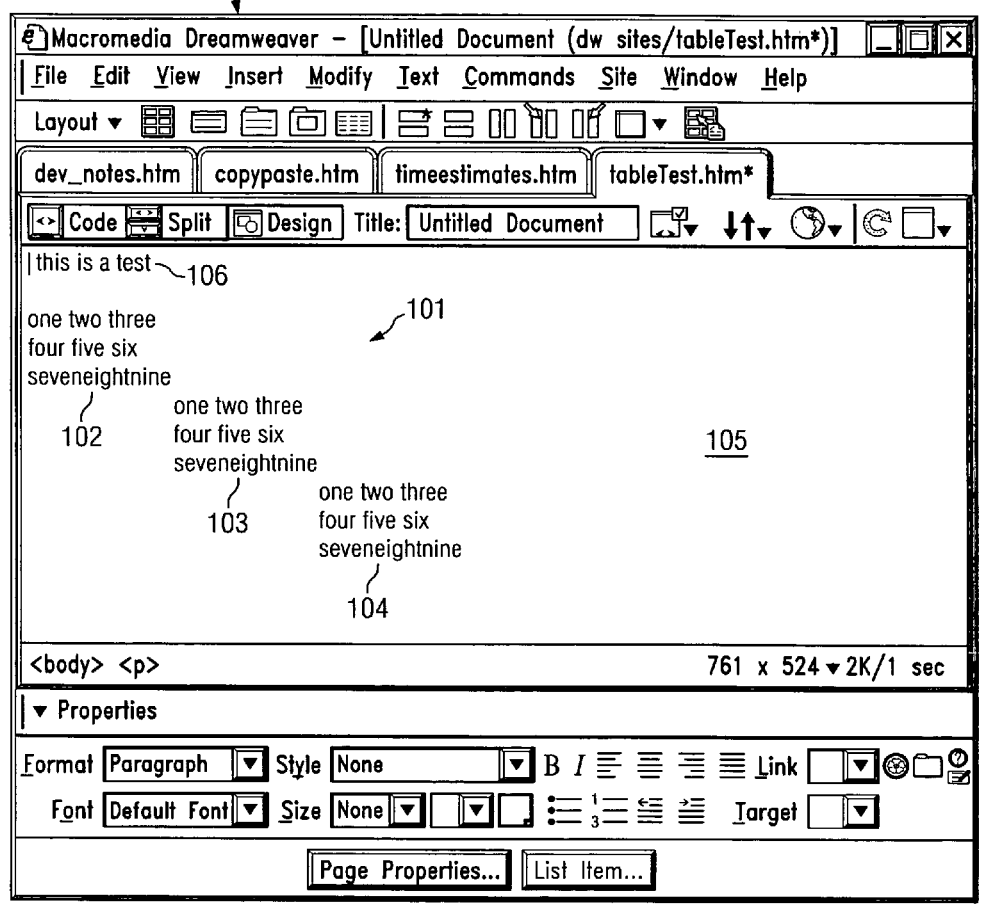
FIG. 1 is a screenshot illustrating a graphical Web development environment displaying a Web page having multiple embedded tables.

FIG. 1 is a screenshot illustrating graphical Web development environment 100 displaying Web page 101 having multiple embedded tables. As displayed in design view 105, text blocks 102-104 appear to be organized into three separate groups within Web page 101. No visual indication is given to the user or developer that text blocks 102-104 comprise any special format or organizational construct. Moreover, to the user, text 106 appears to be no different, except in position, from text blocks 102-104.

Figure 2:
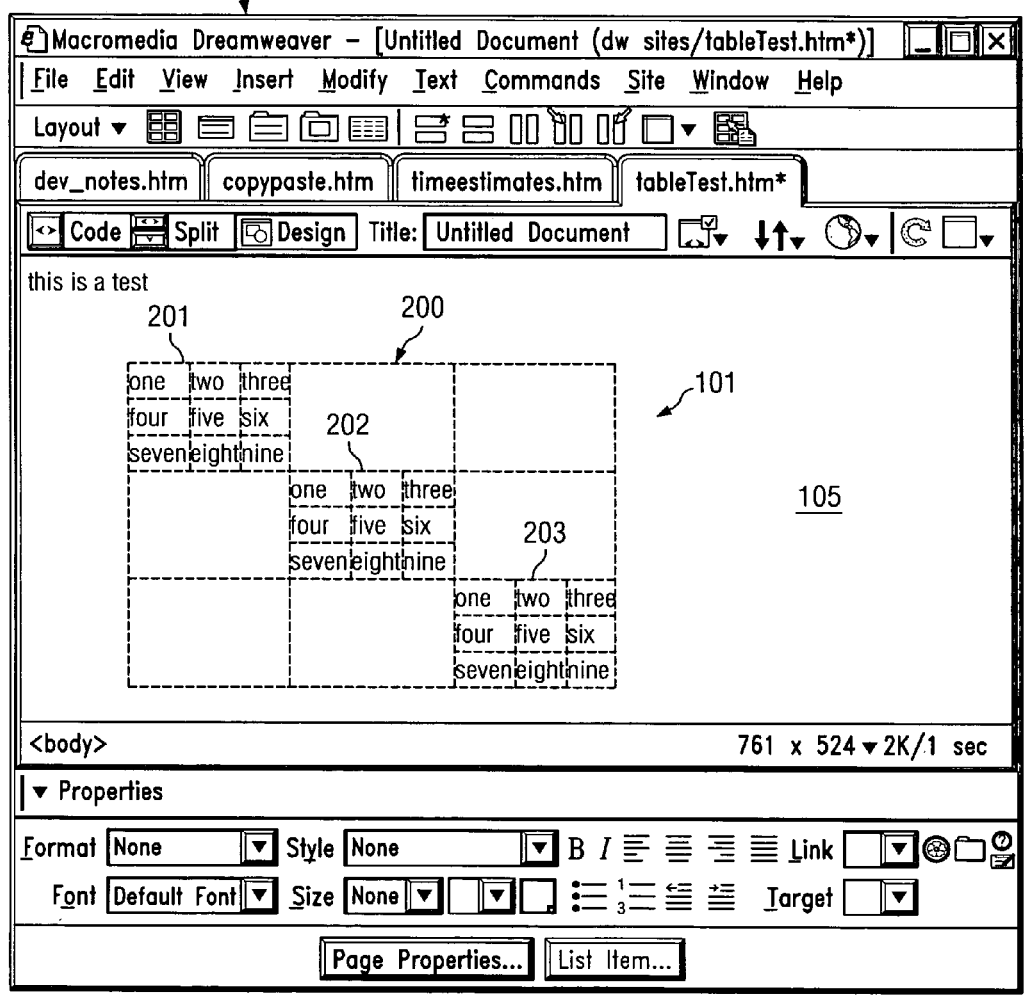
FIG. 2 is a screenshot illustrating a graphical Web development environment displaying a Web page including dotted lines defining the borders of a table and its embedded tables.

Turning now to FIG. 2, FIG. 2 is a screenshot illustrating graphical Web development environment 100 displaying Web page 101 including dotted lines defining the borders of table 200 and embedded tables 201-203. Some development environments, such as Web development environment 100, provide an option to show the user or developer the existence of a container construct by inserting light or segmented lines surrounding the borders of the container within design view 105. As illustrated in FIG. 2, table 200 and embedded tables 201-203 are outlined by dotted lines.

This feature allows a developer to see where the HTML tables are located within the rendering of Web page 101 on design view 105. However, even though the developer is able to see where the tables are within design view 105, it would still be practically impossible to select the editing region of the first cell of table 200. This is because embedded table 201 resides within that first cell, and there is no cell padding provided in table 200. A developer attempting to select the first cell of table 200 would, instead, select one of the cells within embedded table 201.

Figure 3:
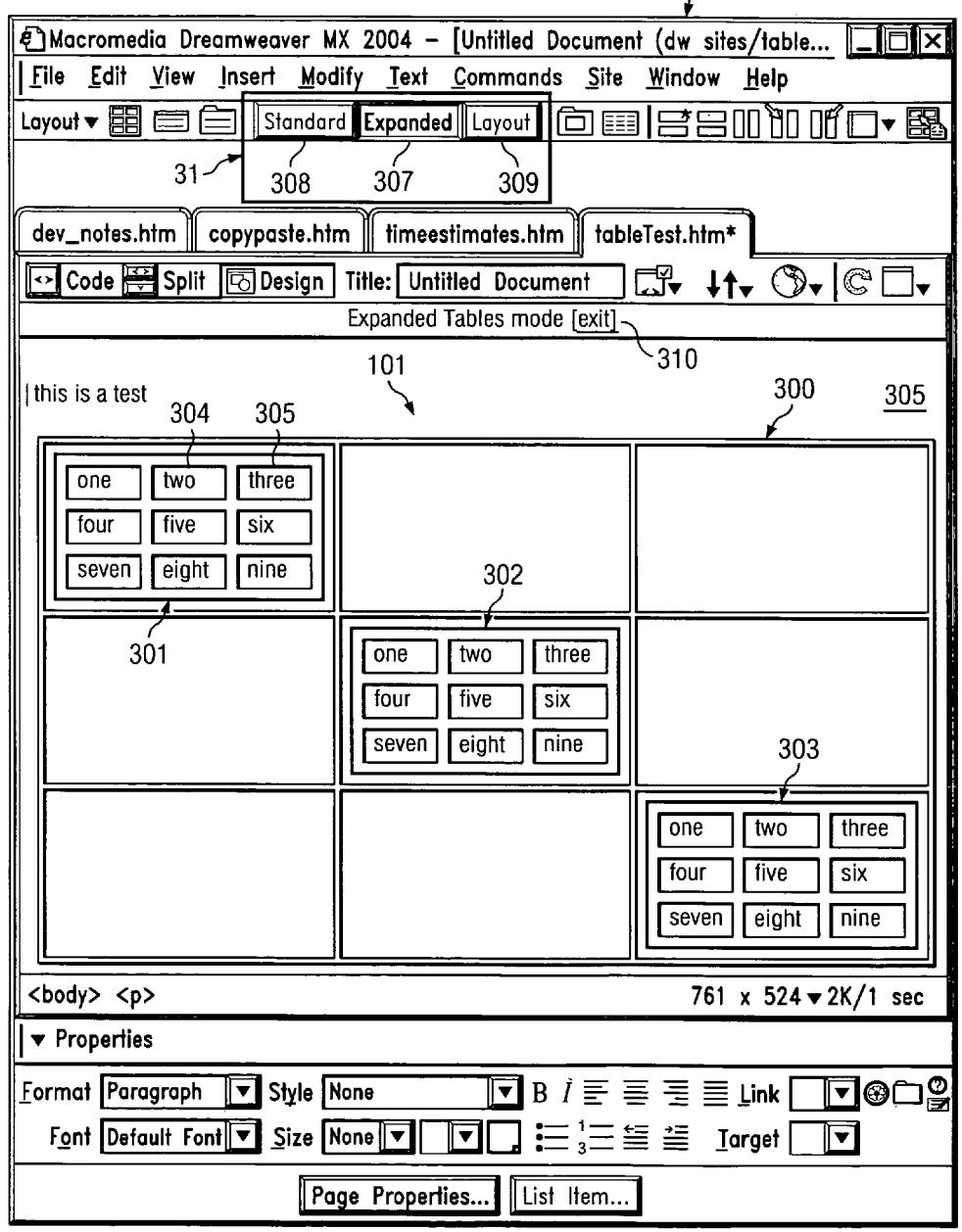
FIG. 3 is a screenshot illustrating a graphical Web development environment configured according to one embodiment of the present invention.

FIG. 3 is a screenshot illustrating graphical Web development environment 30 configured according to one embodiment of the present invention. Design view 305 of Web development environment 30 is shown displaying Web page 101 in an expanded mode. As illustrated in FIGS. 1 and 2, Web page 101 includes table 200 (FIG. 2) and embedded tables 201-203 (FIG. 2). However, in expanded mode, design view 305 renders expanded table 300 and expanded embedded tables 301-303. The developer is now able to easily view the structure and layout of the page, in addition to having easier access to the editing or picking regions of tables 300-303. The underlying source HTML code for Web page 101 is still the same in FIG. 3 as it is in FIGS. 1 and 2. The embodiment of the present invention allows a developer to expand the views of each instance of a container construct within the HTML page, such as Web page 101.

Web development environment 30 presents display mode menu 31 that includes three buttons that control the viewing mode of design view 305. Expanded button 307 is shown highlighted, because FIG. 3 illustrates the expanded view. Standard button 308 and layout button 309 are also offered to a user or developer to change the display mode of design view 305. A user selecting any of the buttons within display mode menu 31 may control the manner in which Web page 101 is displayed in design view 305.

It should be noted that in various embodiments of the present invention, some type of graphical or visual expansion selector may be presented to the user. Additional or alternative embodiments may use a graphical button displayed directly on the workspace of the Web development environment, while other embodiments may provide a visual menu selection from a pop-up or pull-down menu. Still other embodiments may implement multiple versions of a graphical expansion selector within the same embodiment. For example, one embodiment may display an expansion button on the workspace, but also allow the user to select expansion through a menu selection. The examples illustrated in this application are not intended to limit the various acceptable methods for visibly presenting the expansion option to a user.

Because the expanded view of container constructs is intended to temporarily expand the view of the containers in order for the developer to work more easily within them and to view the underlying structure of the Web page, return selector 310 is also provided for the developer. If a developer intended to change the sizing of the underlying container constructs, he or she would generally need to account for the added spacing that is present during the expanded mode. Therefore, in order to more accurately manipulate the size of the tables, the developer may execute or select return selector 310 or even select standard button 308 or layout button 309 to be able to accurately see the sizes of the container constructs.

In implementing the expanded view mode, Web development environment 30 examines the parameters of the container constructs. For example, when a developer selects expanded button 307 to change design view 305 to the expanded mode, Web development environment 30 examines the border, cell spacing, and cell padding parameters of table 200 (FIG. 2) and embedded tables 201-203 (FIG. 2). Web development environment then compares the actual parameters for the container constructs against a minimum for those parameters.

In order to implement the expanded mode, the presently described embodiment of Web development environment 30 enforces a minimum set of parameters. For tables, the expanded mode enforces a minimum border style, i.e., the size and color of a border, a minimum cell spacing, and a minimum cell padding. A minimum cell spacing may be somewhere between two and five pixels, a minimum cell padding may be somewhere between three and ten pixels, while a minimum border may have the parameters of some style of colored line from one to six pixels in width. These numbers represent only one set of possible expanded sizes. Additional or alternative embodiments of the present invention may use different sizes not within those ranges. Similarly, when considering a container construct such as a division or DIV tag, the minimum parameters may be a minimum margin, a minimum content padding, and a minimum border parameters.

If an instance of the container construct has parameters that do not meet the visibility requirements set by the minimum amounts, Web development environment 30 adds space or draws lines to force the container construct to the minimum amounts to achieve the desired visibility. For example, expanded embedded table 301 has been rendered in the expanded view with a border and additional cell padding, such as cell padding 304. Consequently, as expanded embedded tables 301-303 are rendered, expanded table 300 also expands to contain them. Expanded table 300 also includes a border and additional container spacing, such as cell padding 306. Therefore, even though the underlying source HTML defines the tables within Web page 101 as having no border, no cell spacing, and no cell padding, the expanded mode implemented in Web development environment 30 adds enough of those features so as to make it easier for the developer to work within expanded table 300 and expanded embedded tables 301-303.

In an additional or alternative embodiment of the present invention, the user selecting to view Web page 101 in an expanded mode may cause a predefined set of spacing and border attributes to be added or used in rendering the expanded view. For example, table 200 (FIG. 2) may be large enough in the standard view for a developer to easily work with its content. However, when expanded button 307 (FIG. 3) is selected by the user, the additional or alternative embodiment of Web development environment 30 may simply add the predefined sets of spacing to the parameters of table 200 (FIG. 2). Thus, if table 200 would have a cell padding of 12 pixels with no cell spacing or border, Web development environment 30, configured according to the additional or alternative embodiment of the present invention, would simply add the set spacing without comparing the table parameters to a predefined minimum set of values. The resulting operation would be that each table within Web page 101, regardless of its visible parameters, would have a set amount of padding added to its cell padding, a set amount of spacing added to its cell spacing, and the predefined border added for the rendered expanded view.

It should be noted that various methods for expanding the container construct parameters may be implemented in additional and alternative embodiments of the present invention. The examples presented herein are not intended to limit the methods of expansion to any particular manner.

Figure 4:
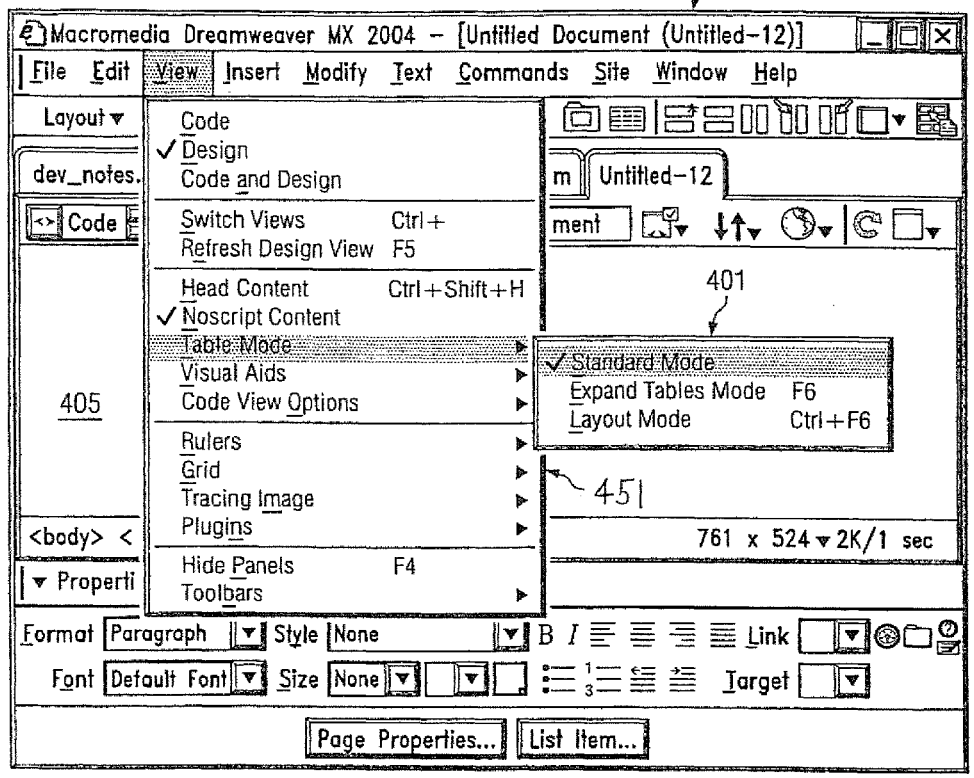
FIG. 4 is a screen shot illustrating a graphical Web development environment displaying a drop down menu to present an expanded mode option to its users.

Turning now to FIG. 4, FIG. 4 is a screen shot illustrating graphical Web development environment 400 configured according to another embodiment of the present invention. In the embodiment shown in FIG. 4, control over the viewing modes in design view 405 is presented to the user in pull-down menu 451. A menu selection of expanded tables mode 401 allows the developer or user to change the viewing mode of design view 405.

It should be noted that in various embodiments of the present invention, there may be many different, alternative methods for presenting a display mode selection to the user. Some embodiments may use a button visible on the user interface of the Web development environment. Other embodiments may provide a pull-down menu selection for the user to change viewing modes. Still other embodiments may use any number of different combinations of buttons or menus to offer such a viewing mode selection.

FIG. 5 is a flowchart illustrating example steps executed in implementing an additional embodiment of the present invention. In step 500, a graphical expansion selector is presented to a user of the Web development environment. On user-selection of the graphical expansion selector, in step 501, the expanding process is activated for each instance of a container construct, such as a table or division, in the Web page. In step 502, the actual content spacing within the container construct is compared with a minimum content spacing. If the minimum content spacing is found to exceed the actual content spacing in step 503, space is added, in step 504, to the actual content spacing to make the actual content spacing equal in size to the minimum content spacing.

In step 505, the actual border attributes, such as the border size and color, of the container construct is compared with a minimum border attributes. In other words, the actual visibility of the existing border attributes or style is compared against the visibility ensured by the minimum border attributes or the predetermined border style (i.e., border color and border width). If the minimum border attributes are determined to exceed the actual border attributes in step 506, the minimum border attributes are applied to the container construct in step 507. If the container construct is determined to be a table in step 508, the actual cell padding within the container construct is compared with a minimum cell padding in step 509, and space is added to the actual cell padding in step 511 to make the actual cell padding equal in size to the minimum cell padding, if the minimum cell padding is found to exceed the actual cell padding in step 510. In step 512, a graphical return selector is presented to a user of the Web development environment. On user-selection of the graphical return selector, in step 513, the Web page within the Web development environment is re-rendered using the actual content spacing, the actual border attributes, and, if a table, the actual cell padding.

Figure 6:
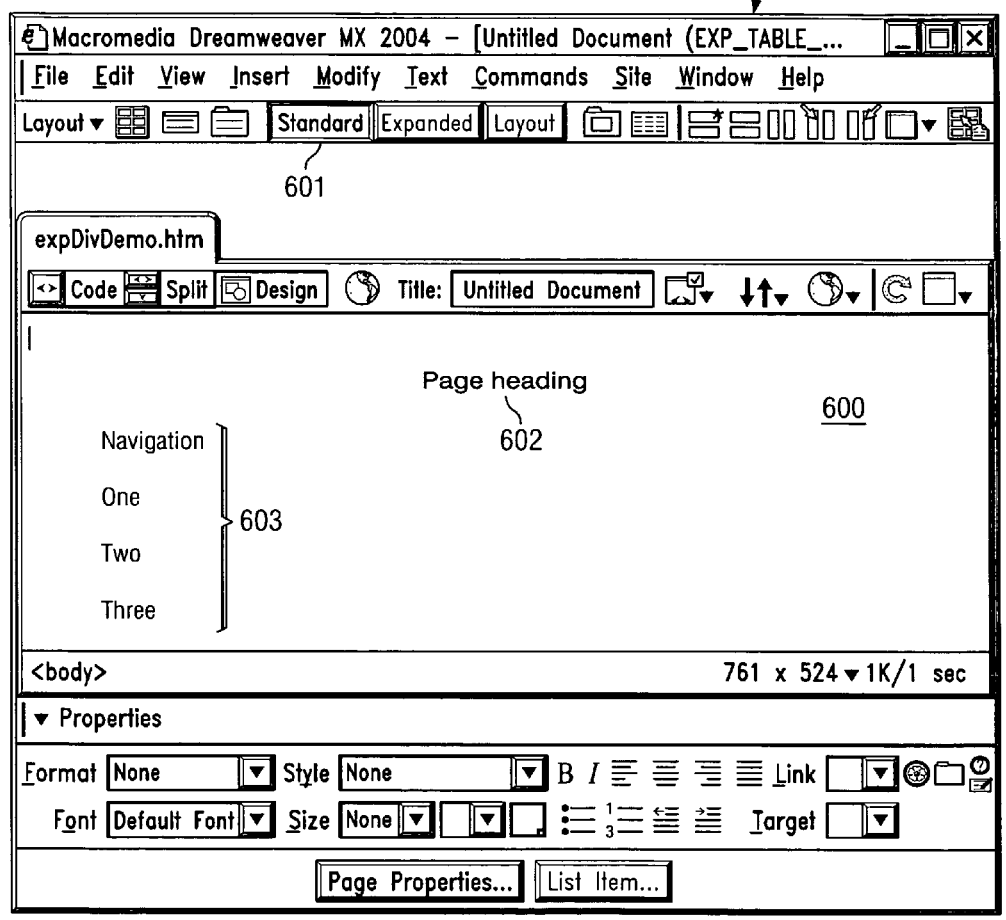
FIG. 6 is a screenshot illustrating a standard view mode of a Web development environment configured according to another embodiment of the present invention.

FIG. 6 is a screenshot illustrating a standard view mode of Web development environment 30 configured according to another embodiment of the present invention. Web development environment 30 is displaying Web page 600 in a standard view mode, as indicated standard selector 601. Web page 600 displays text 602 and 603. In the standard view mode, a developer sees only the text as displayed on Web page 600. There is no other visible indicator of the structure of Web page 600.

Figure 7:
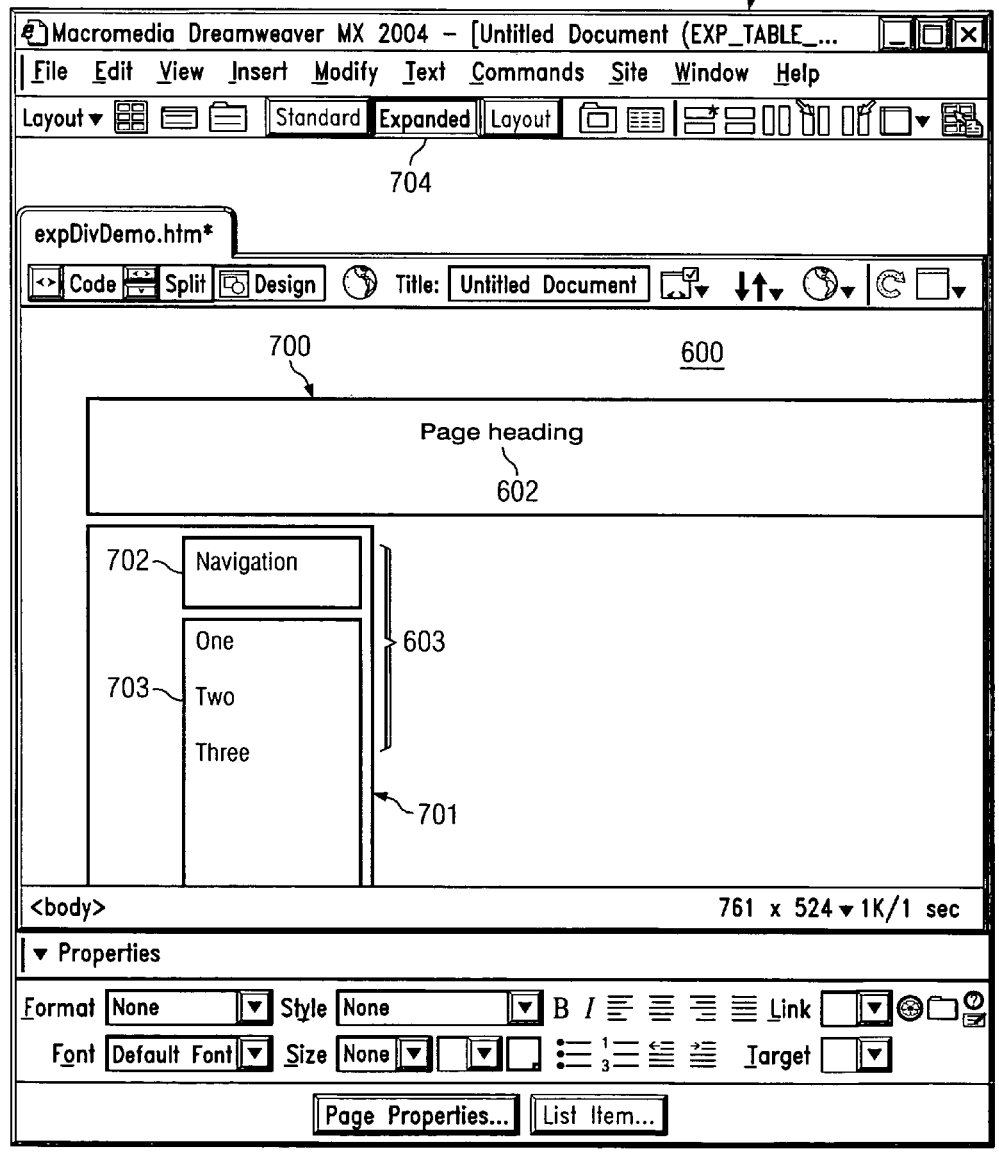
FIG. 7 is a screen shot illustrating an expanded view mode of a Web development environment configured according to another embodiment of the present invention.

FIG. 7 is a screen shot illustrating an expanded view mode of Web development environment 30 configured according to another embodiment of the present invention. As a developer selects expansion selector 704, Web development environment 30 re-renders Web page 600 in the expanded view mode. In the embodiment described, Web development environment 30 may add a predetermined amount of space to each visual attribute of the container constructs within Web page 600, as well as a predefined border, including a border width and color. For example, Web development environment 30 may add a certain amount of padding, margin, cell spacing, and other such visual attributes. Furthermore, Web development environment 30 may add a certain amount to the border width and define a specific border color or line style (e.g., solid, dashed, dotted, and the like). After expansion, text 602 and 603 may now be seen as division constructs, for example. Web development environment 30 may rearrange the location of the division constructs to ensure that the expansion does not cause too great of an overlap of the objects. In such a situation, Web development environment 30 will attempt to maintain the structure of the original, underlying source code.

After expansion, text 602 is visibly contained within container construct 700. Text 603 is separately contained in container construct 702 and 703, which are visibly contained within container construct 701. By viewing Web page 600 in the expanded view mode, the developer may see the structure of Web page 600. Viewing this structure facilitates the development or editing process by allowing the developer to see the underlying structure of the page. Without this structural view, the developer or user is less able to plan the layout of the page.

Moreover, because the visual attributes of container constructs 701-703 are expanded, the developer would be able to select the editing regions in either of the separate container constructs. Without the added spacing, there would be little or no way to select container construct 701 because container constructs 702 and 703 are located on top of container construct 701. In one embodiment of the present invention, container constructs 700-703 may be represented or formed by HTML division constructs.

While HTML has generally been the markup language defining Web pages since the inception of the World Wide Web (WWW), new languages are now being used and developed to take advantage of advancing technologies. Another markup language, Extensible Markup Language (XML), has quickly grown into all aspects of programming. XML defines data, compared to HTML, which defines the formatting of the data. XML is often used to create new markup languages. The new version of HTML has been defined with XML to create Extensible HTML (XHTML). XHTML follows stricter syntax than HTML, which means that the browsers that read and display XHTML may be smaller, thus, available on a wider variety of devices, including thin devices, such as mobile phones, personal digital assistants, and the like. Various embodiments of the present invention may, therefore, be applied to Web development environments that utilize HTML, XHTML, or other such Web page-defining computer language. The descriptions used for the embodiments shown in the FIGURES is meant purely for example and are not intended to limit the application of the various embodiments of the present invention.

Another XML-based language is Macromedia Inc.'s MXML. MXML is an intuitive language that is used to render intelligent client applications running in an interactive multimedia runtime environment, such as Macromedia Inc.'s MACROMEDIA FLASH™ player. MXML is currently used in Macromedia Inc.'s FLEX™ server. FLEX™ is a presentation server and application framework that addresses the requirements of enterprise programmers who want to develop Rich Internet Applications (RIAs). RIAs combine the responsiveness and richness of desktop software with the broad reach of Web applications to deliver a richer, more effective end user experience. The FLEX™ presentation server delivers a standards-based, declarative programming methodology and workflow, along with runtime services, for developing and deploying the presentation tier of rich client applications.

The rich interface pages defined with MXML™ also include container constructs to be rendered in the resulting interface pages, which may be displayed as HTML pages or as interface elements in other interactive multimedia environments, such as MACROMEDIA FLASH™ and the like. In an MXML™ development environment, container constructs, such as an HBox, VBox, form, form item, panel, tile, grid, grid row or item, title window, control bar, HDividedBox, VDividedBox, application, and the like, each define containers which, for example, position content horizontally, an HBox, and/or vertically, a VBox. When viewed in a design view of the development environment, such container constructs exhibit similar difficulties as those encountered with HTML. Moreover, constructs, such as a VBox, allow a horizontal cursor to position text vertically within the VBox, thus, adding a new dimension to standard HTML editing.

Embodiments of the present invention may also be applied to non-HTML development environments, such as those that use MXML, to add padding or spacing on either side of an HBox or on the top and bottom of a VBox, in order to provide the developer with a better view of the construction of the page in addition to providing easier access to the container contents for editing. For example, referring to FIGS. 6 and 7, the HTML and CSS described above could be replaced in selected embodiments with MXML defining an HBox, in place of container construct 700, and a VBox, in place of container construct 703. In such an embodiment, padding may be added to HBox (container construct 700) on the left and right sides of any text within the container and to VBox (container construct 703) on the top and bottom of any contained text. The addition of the border styles to each container also helps define the page construction to the developer.

It should be noted that the example container constructs given in describing the various embodiments of the present invention should not be construed as limiting the particular containers solely to the ones enumerated herein. Container constructs may be defined as tables, divisions, forms, form items, panels, tiles, grids, grid rows or items, title windows, control bars, HDividedBoxes, VDividedBoxes, applications, or any other container constructs defined by a Web enabling language, code, or script.

FIG. 8 is a flowchart illustrating example steps executed in implementing an alternative embodiment of the present invention. In step 800, there is an expansion view selector presented to a user editing a Web page in a design view of the Web development environment. In step 801, a determination is made whether the expansion view selector has been activated by the user. If not, in step 803, the expansion mode is not activated. If activated, a predefined amount of space is added, in step 802, to the container spacing attributes of each instance of a container construct within the Web page. A predefined border style is then applied to each instance of the container construct in step 804. In step 805, a determination is made whether the expansion view selector has been deactivated. If not, in step 807, the expansion view is maintained. Otherwise, in step 806, the Web page is re-rendered using the original container spacing attributes and the original border style.

The program or code segments making up the expansion feature can be stored in a computer readable medium or transmitted by a computer data signal embodied in a carrier wave, or a signal modulated by a carrier, over a transmission medium. The "computer readable medium" may include any medium that can store information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 9:
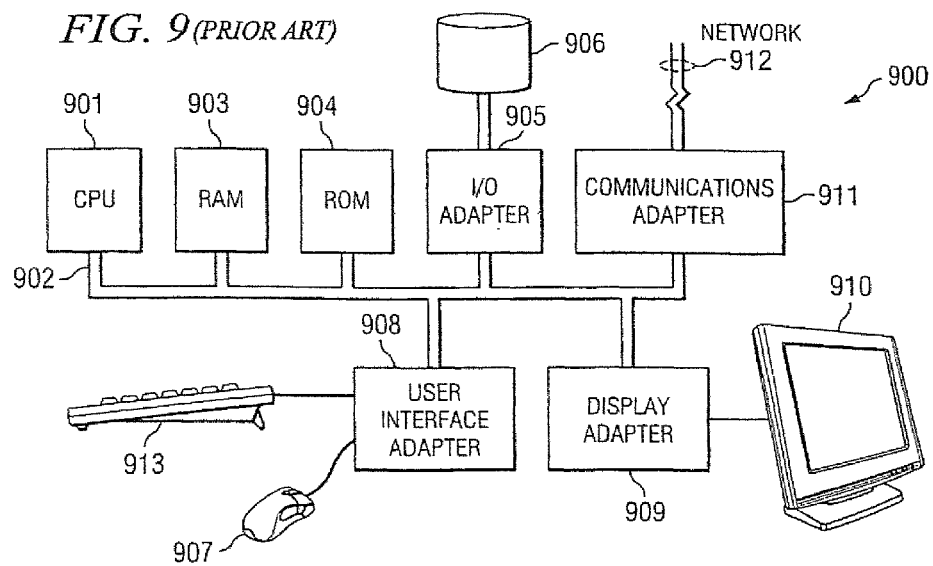
FIG. 9 is a block diagram illustrating a computer system adapted to use embodiments of the present invention.

FIG. 9 illustrates computer system 900 adapted to use embodiments of the present invention, e.g. storing and/or executing software associated with the embodiments. Central processing unit (CPU) 901 is coupled to system bus 902. The CPU 901 may be any general purpose CPU. However, embodiments of the present invention are not restricted by the architecture of CPU 901 as long as CPU 901 supports the inventive operations as described herein. Bus 902 is coupled to random access memory (RAM) 903, which may be SRAM, DRAM, or SDRAM. ROM 904 is also coupled to bus 902, which may be PROM, EPROM, or EEPROM. RAM 903 and ROM 904 hold user and system data and programs as is well known in the art.

Bus 902 is also coupled to input/output (I/O) controller card 905, communications adapter card 911, user interface card 908, and display card 909. The I/O adapter card 905 connects storage devices 906, such as one or more of a hard drive, a CD drive, a floppy disk drive, a tape drive, to computer system 900. Communications card 911 is adapted to couple the computer system 900 to a network 912, which may be one or more of a telephone network, a local (LAN) and/or a wide-area (WAN) network, an Ethernet network, and/or the Internet network. User interface card 908 couples user input devices, such as keyboard 913, pointing device 907, and the like, to the computer system 900. The display card 909 is driven by CPU 901 to control the display on display device 910.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A computer-implemented method comprising:
 displaying an output presentation of a Web page in a design view of a Web development environment displayed on a computer display device, wherein said Web page comprises one or more container constructs comprising at least a first container with no actual container spacing;
 presenting a graphical expansion selector on an interface of said Web development environment; and
 responsive to receiving a user selection of said graphical expansion selector:
  adding space to actual container spacing of said one or more container constructs in said output presentation to make said actual container spacing at least equal in size to a predefined minimum container spacing, wherein the actual container spacing of the first container increases from none to at least the predefined minimum container spacing; and
  applying a predefined border style to said one or more container constructs.

2. The method of claim 1 further comprising:
 comparing said actual container spacing with said predefined minimum container spacing, wherein said adding space step is responsive to said predefined minimum container spacing exceeding said actual container spacing; and
 said applying said predefined border comprising one or more of:
  setting a pre-defined border color; and
  adding width to an actual border width of said Web page to make said actual border width at least equal to a minimum border width of said predefined border style.

3. The method of claim 1 further comprising:
 presenting to said user a graphical return selector; and
 responsive to said user selecting said graphical return selector, rendering said Web page within said Web development environment using said actual content spacing and said actual border style.

4. The method of claim 1:
 wherein said actual border style comprise:
  a border width coded into source code of said Web page; and
  a border color coded into said source code; and wherein said predefined border style comprises one or more of:
a minimum border width; and
a pre-defined border color.

5. The method of claim 1:
wherein said actual container spacing comprises one or more of: actual content padding; actual cell spacing; and actual margin size; and
wherein said predefined minimum container spacing comprises one or more of: minimum content padding; minimum cell spacing; and minimum margin size.

6. The method of claim 1 wherein said one or more container constructs comprise one or more of: a form; a form item; a panel; a tile; a grid; a grid row; a grid item; a title window; a control bar; a HDividedBox; a VDividedBox; an application; a HBox; a VBox; a table construct; and a division construct.

7. A computer-implemented method comprising:
receiving, at a Web development environment displayed on a computer display device, a selection from a user to view a Web page in an expanded mode; and
responsive to said selection, expanding a set of visual attributes for each of a plurality of instances of a container construct within said Web page, wherein said set of visual attributes are expanded by at least a predefined minimum value, wherein at least one of the visual attributes of at least one container construct is increased from none to at least the predefined minimum value.

8. The method of claim 7 wherein said set of visual attributes comprises one or more of: cell spacing; content padding; margin size; and a border style.

9. The method of claim 7 wherein said expanding comprises:
comparing said set of visual attributes for said each instance with a set of predefined minimum visual attributes; and
responsive to ones of said set of predefined minimum visual attributes exceeding corresponding ones of said set of visual attributes, modifying said ones of said set of visual attributes to equal said corresponding ones of said set of predefined minimum visual attributes.

10. The method of claim 9:
wherein said container construct is a table; and
wherein said modifying comprises:
inserting content padding to equal content padding of said set of predefined minimum visual attributes;
applying a predetermined border style of said set of predefined minimum visual attributes; and
inserting cell spacing to equal cells spacing of said set of predefined minimum visual attributes.

11. The method of claim 9:
wherein said container construct is a division; and
wherein said modifying comprises:
inserting content padding to equal content padding of said set of predefined minimum visual attributes;
applying a predetermined border style of said set of predefined minimum visual attributes; and
inserting margin spacing to equal a margin size of said set of predefined minimum visual attributes.

12. The method of claim 7 wherein said expanding comprises:
applying a predefined border style;
adding a predefined content padding value to a content padding of said set of visual attributes;
adding a predefined cell spacing value to a cell spacing of said set of visual attributes when said container construct is a table; and
adding a predefined margin value to a margin size of said set of visual attributes when said container construct is a division.

13. The method of claim 7 wherein said container construct comprises one or more of: a table; and a division.

14. The method of claim 7 further comprising:
receiving a signal from said user to view said Web page in a non-expanded mode; and
responsive to said signal, rendering said Web page using said set of visual attributes for each instance of said container construct.

15. A computer program product tangibly embodied on a computer readable data storage medium with computer program logic recorded thereon, the computer program product comprising:
code for displaying to a user of a Web development environment an option to expand a Web page under edit in said Web development environment;
code, executable responsive to said user selecting said option to expand said Web page, for adding space to existing container spacing a container construct being presented in a design view of a Web development environment for a Web page to make said existing container spacing at least equal in size to a predefined minimum container spacing, wherein the existing container spacing is increased from none to at least the predefined minimum container spacing; and
code, additionally executable responsive to said user selecting said option to expand said Web page, for rendering, in the design view, a minimum border to said container construct.

16. The computer program product of claim 15 further comprising:
code for comparing said existing container spacing with said predefined minimum container spacing, wherein said code for adding is executed responsive to said predefined minimum container spacing exceeding said existing container spacing; and
code for comparing an existing border of said container construct with said minimum border, wherein said code for rendering is executed responsive to said minimum border exceeding a visibility of said actual border.

17. The computer program product of claim 15 further comprising:
code for displaying to a user of said Web development environment an option to undo expansion; and
code for re-rendering said Web page within said Web development environment using said existing container spacing and said existing border in response to user selection of said option to undo expansion.

18. The computer program product of claim 15 wherein said container construct comprises at least one or more of: a table construct; and a division construct.

19. The computer program product of claim 18 wherein said computer program logic for expanding is executed for each instance of said container construct within said Web page.

20. A computer-implemented Web development system comprising;
a central processing unit (CPU);
a storage device coupled to said CPU;
a display device coupled to said CPU;
a Web development application stored in said storage device and executable by said CPU, wherein execution of said Web development application creates a Web development environment comprising:

a design view configured to display an output presentation of a Web page being edited within said Web development environment, said design view further configured to expand a container construct within said design view; wherein, when expanding said container construct, said design view is further configured to insert space in an actual container spacing to increase said actual container spacing from none to at least equal in size to a predefined minimum container spacing and render a preset border style on said container construct; and a visual expansion selector displayed on said design view, wherein said visual expansion selector executes said expansion when selected by said user.

21. The computer-implemented system of claim 20 wherein said design view is further configured to evaluate:

a difference between said actual container spacing of a Web page and said predefined minimum container spacing, wherein said design view inserts said space responsive to said predefined minimum container spacing exceeding said actual container spacing and to evaluate a difference between an actual border style of said container construct and said preset border style, wherein said design view renders said preset border style responsive to said preset border style exceeding said actual border style.

22. The computer-implemented system of claim 20 further comprising:

a return selector displayed on said design view, wherein, responsive to said users selecting said return selector, said design view is further configured to render said Web page using said actual container spacing and said actual border style.

23. The computer-implemented system of claim 20:
wherein said actual border style comprise:
an actual border width and an actual border color; and
wherein said preset border style comprise:
a preset border width and a preset border color.

24. The computer-implemented system of claim 20:
wherein said actual container spacing comprises one or more of: actual content padding; actual cell spacing; and actual margin size; and
wherein said predefined minimum container spacing comprises one or more of: minimum content padding; minimum cell spacing; and minimum margin size.

25. The computer-implemented system of claim 20 wherein said expansion is performed for each instance of said container construct within said Web page.

26. A computer program product tangibly embodied on a computer readable data storage medium with computer program logic recorded thereon, the computer program product comprising:

code for receiving a selection from a user to view a Web page in an expanded mode of a Web development environment; and code, executable responsive to said selection, for expanding a set of visual attributes for each instance of a container construct within said Web page, wherein said set of visual attributes are expanded by at least a predefined minimum value, wherein at least one of the visual attributes of at least one instance of the container construct is increased from none to at least the predefined minimum value.

27. The computer program product of claim 26 wherein said code for expanding comprises:

code for comparing said set of visual attributes for said each instance with a set of predefined minimum visual attributes; and code, executable responsive to ones of said set of predefined minimum visual attributes exceeding corresponding ones of said set of visual attributes, for modifying said ones of said set of visual attributes to equal said corresponding ones of said set of predefined minimum visual attributes.

28. The computer program product of claim 27:
wherein said container construct is a table; and
wherein said code for modifying comprises:
code for inserting content padding to equal content padding of said set of predefined minimum visual attributes;
code for applying a predetermined border style of said set of predefined minimum visual attributes; and
code for inserting cell spacing to equal cells pacing of said set of predefined minimum visual attributes.

29. The computer program product of claim 27:
wherein said container construct is a division; and
wherein said code for modifying comprises:
code for inserting content padding to equal content padding of said set of predefined minimum visual attributes;
code for applying a predetermined border style of said set of predefined minimum visual attributes; and
code for inserting margin spacing to equal a margin size of said set of predefined minimum visual attributes.

30. The computer program product of claim 29 wherein said code for applying said predetermined border style comprises:

code for adding width to an actual border width of said container construct to make said actual border at least equal to a minimum border width of said predetermined border style; and
code for setting a predetermined border color to said container construct.

31. The computer program product of claim 26 wherein said code for expanding comprises:
code for applying a predefined border style;
code for adding a predefined content padding value to a content padding of said set of visual attributes;
code for adding a predefined cell spacing value to a cell spacing of said set of visual attributes when said container construct is a table; and
code for adding a predefined margin value to a margin size of said set of visual attributes when said container construct is a division.

32. The computer program product of claim 31 wherein said code for applying said predetermined border style comprises:
code for adding width to an actual border width of said container construct to make said actual border at least equal to a minimum border width of said predetermined border style; and
code for setting a predetermined border color to said container construct.

33. The computer program product of claim 26 further comprising:
code for receiving a signal from said user to view said Web page in a non-expanded mode; and
code, executable responsive to said signal, for rendering said Web page using said set of visual attributes for each instance of said container construct.

34. A computer implemented method comprising:
presenting, by a software development environment displayed on a computer display device, a design view that shows an output presentation of a software application under edit in said software development environment;

presenting to a user of said software development environment a graphical expansion selector; and responsive to said user selecting said graphical expansion selector:

adding space to actual container spacing of the output presentation shown in the design view to make said actual container spacing at least equal in size to a predefined minimum container spacing, wherein the actual container spacing of a first container increases from none to at least the predefined minimum container spacing; and applying a predefined border style to said container construct.

35. The method of claim 34 further comprising:

comparing said actual container spacing with said predefined minimum container spacing, wherein said adding space step is responsive to said predefined minimum container spacing exceeding said actual container spacing; and comparing said actual border style of said container construct with said predefined border style, wherein said applying said predefined border style is responsive to said predefined border style exceeding said actual border style, said applying said predefined border comprising one or more of:

setting a pre-defined border color; and adding width to an actual border width of said interface page to make said actual border width at least equal to a minimum border width of said predefined border style.

36. The method of claim 34 further comprising:

presenting to a user of said development environment a graphical return selector; and responsive to said user selecting said graphical return selector, rendering said interface page within said development environment using said actual content spacing and said actual border style.

37. The method of claim 34:

wherein said actual border style comprise: a border width coded into source code of said interface page; and a border color coded into said source code; and wherein said minimum border style comprises one or more of: a minimum border width; and a pre-defined border color.

38. The method of claim 34 wherein said container construct comprises one or more of: a form; a form item; a panel; a tile; a grid; a grid row; a grid item; a title window; a control bar; a HDividedBox; a VDividedBox; an application; an HBox; a VBox; a table construct; and a division construct.

39. The method of claim 34 wherein said expanding is performed for each instance of said container construct within said interface page.

40. A computer implemented method comprising:

receiving a selection from a user of a development environment displayed on a computer display device, wherein said selection selects to view an interface page in an expanded mode;

responsive to said selection, expanding a set of visual attributes for each instance of a container construct within said interface page, wherein said set of visual attributes are expanded by at least a predefined minimum value, wherein at least one of the visual attributes of at least one container construct is increased from none to at least the predefined minimum value.

41. The method of claim 40 wherein said set of visual attributes comprises one or more of: cell spacing; content padding; margin size; and a border style.

42. The method of claim 40 wherein said expanding comprises:

comparing said set of visual attributes for said each instance with a set of predefined minimum visual attributes; and responsive to ones of said set of predefined minimum visual attributes exceeding corresponding ones of said set of visual attributes, modifying said ones of said set of visual attributes by at least said predefined minimum value.

43. The method of claim 40 wherein said container construct comprises one or more of: a form; a form item; a panel; a tile; a grid; a grid row; a grid item; a title window; a control bar; a HDividedBox; a VDividedBox; an application; an HBox; a VBox; a table construct; and a division construct.

44. The method of claim 40 further comprising:

receiving a signal from said user to view said interface page in a non-expanded mode; and responsive to said signal, rendering said interface page using said set of visual attributes for each instance of said container construct.

* * * * *